United States Patent [19]
Rowe

[11] Patent Number: 6,074,682
[45] Date of Patent: Jun. 13, 2000

[54] JALAPENO HAM PRODUCT AND METHOD OF MAKING SAME

[75] Inventor: James Rowe, Vorhees, N.J.

[73] Assignee: Hansel 'N Gretal Brand, Inc., Glendale, N.Y.

[21] Appl. No.: 09/107,927

[22] Filed: Jun. 30, 1998

[51] Int. Cl.[7] ...................................... A23L 1/318
[52] U.S. Cl. .......................... 426/281; 426/652; 426/641; 426/645; 426/647
[58] Field of Search .............................. 426/92, 106, 125, 426/129, 281, 302, 305, 652, 641, 645, 647

[56] References Cited

U.S. PATENT DOCUMENTS

| | | | |
|---|---|---|---|
| 3,590,721 | 7/1971 | Hoffmann | 426/281 X |
| 4,029,824 | 6/1977 | Langen | 426/281 |
| 4,940,590 | 7/1990 | Williams et al. | 426/92 |
| 5,200,223 | 4/1993 | Simonsen | 426/281 |

*Primary Examiner*—Milton Cano
*Attorney, Agent, or Firm*—Paul J. Sutton

[57] ABSTRACT

The invention provides a ham and water product that is flavored with jalapeno peppers and a method of making a jalapeno flavored ham and water product. In a preferred embodiment, a ham is injected with a pickle solution, processed to increase surface ratio, and treated with a buffered jalapeno composition.

17 Claims, No Drawings

JALAPENO HAM PRODUCT AND METHOD OF MAKING SAME

TECHNICAL FIELD

1. Technical Field

This invention relates to a jalapeño ham and water product and a process for dispersing and flavoring ham with jalapeño peppers.

2. Description of the Invention

The invention provides ham flavored and embedded with jalapeño peppers. The invention also provides a method in which ham is contacted and embedded with jalapeño peppers.

In a preferred embodiment, trimmed ham muscles are injected with a pickle comprising water, dextrose, salt, isolated soy protein, potassium lactate, sodium phosphate, sodium erythorbate and cure, then the ham is passed through a large breaker plate. The passage through the breaker plate increases the surface area of the ham which provides for increased absorption and even distribution of the added peppers. The large orifices in the breaker plate also allow the ham to retain the whole muscle look.

After the ham muscles have been injected with the pickle (and usually after they have been passed through the breaker plate), they are typically massaged over a period of 8 hours to release surface binding proteins and stored over a period of 20 to 48 hours for color development at no more than 40° F. to avoid spoilage.

The massaged ham muscles are mixed under reduced pressure with jalapeño peppers that have been marinated, washed, drained and buffered with sodium or potassium tripolyphosphate to prevent breakdown of binding meat protein. It has been discovered that the use of unbuffered peppers can cause water to come out of the ham, leading to an undesirably wet looking product in the retail package. This mixing step also results in the jalapeño pepper being embedded in the ham muscle.

The ham mixture may be sealed in a cook-in-bag under reduced pressure, typically in Cryovac apparatus.

The plastic sealed ham is typically cooked until it attains an internal temperature of at least 148° F. and is then cooled to a minimum of 40° F. and packed for sale.

The final product retains the natural goodness of ham but has a distinct flavor from jalapeño peppers. Thus consumers are provided with a ham food product that is nutritious, convenient, delicious and low in fat.

Other properties and details of this invention are illustrated in the following example. It is to be understood that the particular ingredients, amounts used, and other conditions are not to be construed in a manner that would unduly limit the scope of this invention. The example merely illustrates a preferred embodiment of the invention. All %s are weight percent.

EXAMPLE

A pickling composition was prepared containing:

| | |
|---|---|
| water | 65.9% |
| dextrose | 19.7% |
| salt | 7.5% |
| isolated soy protein | 4.7% |
| sodium tripolyphosphate | 1.25% |
| sodium erythorbate | 0.13% |
| cure | 0.87% |

The isolated soy protein was obtained from Protein Technology, St. Louis, Mo. Cure is a salt mixture comprising 6.25% sodium nitrite.

Each ham muscle was injected with 35% by weight pickling/cure solution. The muscles were massaged in an open massager for 9 hours at 8–12 rpm for 3 minutes on and 27 minutes off then stored at 40° F. for up to 48 hours.

The meat muscles and 10.9% marinated jalapeño peppers (washed and drained before use), 0.12% sodium tripolyphosphate to buffer, 5.1% washed, diced red peppers and 1.8% isolated soy protein (all based on injected weight of ham muscles) were mixed for 30 minutes at 10 revolutions per minute under reduced pressure. The jalapeño peppers were San Macros, Mexico Brand, packed in water, vinegar, carrots, salt, onions, sesame oil, garlic and spice marinate.

The ham muscles were then sealed under reduced pressure in plastic cook-in-bags in 13 to 14 pound units, placed in 4×6 stainless cans with lids and cooked to an internal temperature of at least 148° F.

The ham was cooled to 40° F. and packaged.

What is claimed:

1. A method of making a ham product comprising the steps of:

injecting a ham muscle with an aqueous pickle composition; and contacting and embedding the ham with jalapeno peppers;

wherein said peppers have been treated with a buffer.

2. The method of claim 1 wherein said step of contacting and embedding comprises combining said peppers and said ham muscle in a mixer.

3. The method of claim 1 wherein said buffer is tripolyphosphate.

4. The method of claim 1 wherein said pickle composition comprises isolated soy protein.

5. The method of claim 1 wherein said pickle composition comprises potassium lactate.

6. The method of claim 1 wherein said pickle composition comprises water, dextrose, salt, isolated soy protein, sodium tripolyphosphate, sodium erythrobate, and sodium nitrite.

7. The method of claim 1 wherein said ham muscle is treated to increase its surface area.

8. The method of claim 7 wherein the treatment to increase surface area comprises passing the ham muscle through a breaker plate.

9. The method of claim 8 further comprising the step of massaging said ham muscle to form massaged ham muscle.

10. The method of claim 9 wherein said massaged ham muscle is mixed with buffered jalapeño peppers.

11. The method of claim 10 further comprising the step of cooking said ham muscle until it attains an internal temperature of at least 148° F.

12. A ham product comprising:
- a ham muscle comprising added water and embedded jalapeño peppers;
- wherein said jalapeño peppers have been treated with a buffer.

13. The ham product of claim 12 further comprising isolated soy protein.

14. The ham product of claim 12 further comprising potassium lactate.

15. The ham product of claim 12 wherein said buffer is tripolyphosphate.

16. The ham product of claim 12 wherein said ham muscle has been treated to increase its surface area.

17. A ham product made by the method of claim 1.

\* \* \* \* \*